March 28, 1939. H. C. DREISCHERF 2,152,405
SYSTEM FOR SUPPLYING ELECTRICITY TO MOTOR VEHICLES
Filed May 7, 1937
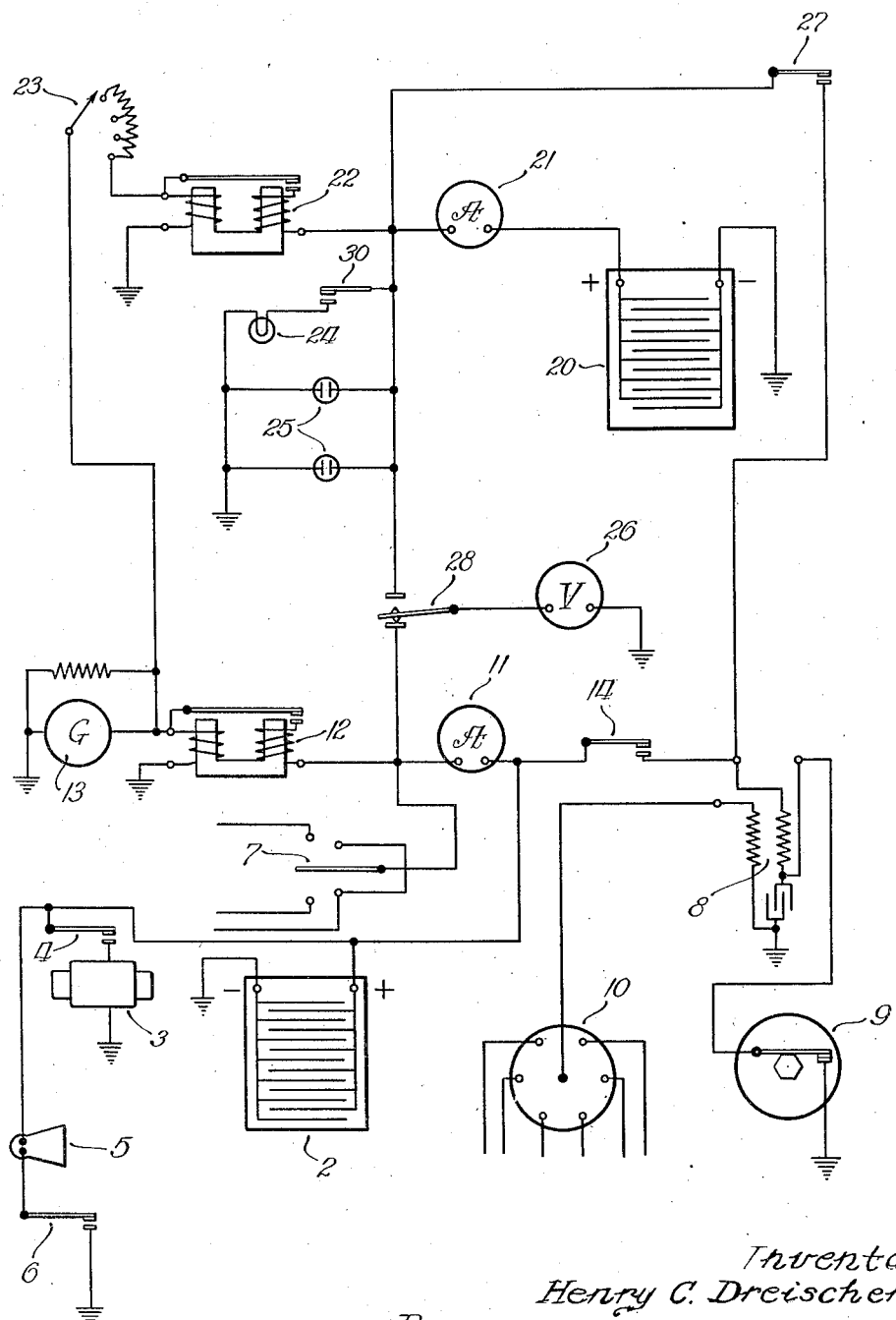
Inventor:
Henry C. Dreischerf
By: Richardson and Auer
Attys Patented Mar. 28, 1939

2,152,405

UNITED STATES PATENT OFFICE 2,152,405

SYSTEM FOR SUPPLYING ELECTRICITY TO MOTOR VEHICLES

Henry C. Dreischerf, Chicago, Ill.

Application May 7, 1937, Serial No. 141,345

8 Claims. (Cl. 290—37)

My invention relates in general to systems for supplying electricity to motor vehicles, and comprises what is commonly known as a starting system, or starting and ignition system. These systems, as is well known, were originally designed to supply current for the starting motor and for the ignition circuit, as well as the headlights and horn; but more recently such devices as radios, heaters, etc. have been largely used and are commonly connected to the starting system as the only available source of electrical energy. These added devices consume a large amount of current, and severely tax the capacity of the system.

In an ordinary automobile, which is generally subjected to intermittent use over short periods with a large proportion of daytime running, the increased load has not been too great for satisfactory service to be obtained, although certain difficulties have been encountered. But in the case of trucks and buses, especially where such vehicles are engaged in long distance traffic, the conditions are far more exacting and have created a real problem. Trucks used in inter-city hauling, for instance, often have to run a large part of the night, or even all night; and the generator load, with the extra lights that have to be used and a heater and radio, may amount to 30 amperes or more. This is usually more than the generator capacity, and therefore part of the energy consumed has to be supplied from the battery, which is depleted instead of being charged. As a result, some of the equipment may have to be shut off when it is most needed; and in any event the tendency is toward a low state of charge in the battery, which is bound to manifest itself in starting trouble.

One way of taking care of this situation would be to simply provide a starting system of much larger capacity, sufficient to take care of any demands that might be made upon it. This method has not been generally adopted because of the increased cost. Generators and batteries of the sizes suitable for ordinary automobiles are made in large quantities and consequently are relatively cheaper than special equipment of larger capacity. Replacements are more readily obtained also. In view of these facts, it is very desirable to use standard automobile generators and batteries for truck service.

The problem is usually met, therefore, by adjusting the charging rate of the generator to the maximum so that it will carry as much of the night load as possible. If the night load is not too heavy, the generator may be able to carry all of it, in which case the battery can be kept charged up. This method of operation has its objections, however. In the first place, the constant heavy load on the generator is liable to result in overheating, commutator trouble, etc., and consequently the generator often gets out of order and needs frequent replacement. Secondly, and perhaps more important, the high charging rate of the generator causes the battery to quickly charge up in the daytime, after which it is overcharged to a large extent. This not only wastes the current, but causes damage to the battery. Thus constant inspection and supervision of the equipment is necessary but, in spite of all precautions that can be taken, breakdowns on the road are of frequent occurrence.

In accordance with my invention, the problem outlined in the foregoing is solved by the use of standard equipment, that is, standard automobile generators and batteries of the usual capacity I provide two batteries and associated switching equipment and circuit arrangements such that the various objections pointed out may be avoided. A system built in accordance with my invention is not only cheaper than a large capacity starting system of the ordinary type, but is actually better. The various advantages secured will be pointed out more in particular hereinafter in the course of the description of the invention and the explanation of its operation.

The invention is shown in the accompanying drawing, which is a diagrammatic circuit drawing showing the apparatus in conventional form, together with the wiring or circuit connections.

Referring to the drawing, it will be assumed that the equipment is installed in a truck which is in use for inter-city hauling over long distances and is equipped with headlights, running lights, a radio, a heater, and perhaps other auxiliary equipment of a current-consuming character.

Describing the apparatus shown in the drawing, the reference numeral 2 indicates a storage battery which may be an ordinary automobile starting battery having a capacity of 120 ampere-hours. The reference numeral 3 indicates the starting motor, which is adapted to be connected up to the battery 2 by means of the starting switch 4. The usual horn is indicated at 5, and the associated switch is shown at 6. The headlights and running lights are not shown, but are connected to the battery in the usual manner by means of the lighting switch 7.

The ignition system comprises the interrupter or breaker 8, the induction coil 9, and the distributor 10. The drawing shows the proper arrangement for a six-cylinder motor. The primary winding of the induction coil 8 is connected to the battery 2 in series with the breaker 9 by means of the main ignition switch 14.

The reference numeral 13 indicates the usual generator which may have a maximum safe output of about 25 amperes. The generator is connected to the battery 2 through a relay or cutout 12 and the ammeter 11. The connection is normally open at the cutout, which operates only after the voltage of the generator has reached a certain value after starting and has the usual function of preventing the battery from discharging into the generator when the latter is not running.

The reference numeral 20 indicates an auxiliary storage battery which may be similar to the battery 2, having a capacity of 120 ampere-hours. The auxiliary battery is charged from the generator 13 through a charging switch 23, a relay or cutout 22, and the ammeter 21. The charging switch 23 is preferably in the form of a low resistance rheostat provided with a movable contactor by means of which a part or all of the resistance may be cut out. The cutout 22 of course performs the same function with respect to the battery 20 as cutout 12 does for the battery 2. The primary winding of the induction coil may be connected to the auxiliary battery by way of an auxiliary ignition switch 27, the circuit including the ammeter 21 that is, instead of being connected directly to the battery 20, the ignition switch 27 is connected to the battery circuit at a point between the cutout 22 and the ammeter 21. At this same point, the instrument panel lamp 24 may be connected up to the battery through the switch 30, and here are also connected a number of service sockets such as 25 which are used for supplying current to the radio and heater and any other device that may be in service.

The reference numeral 26 indicates a voltmeter which is used for determining the voltage of the batteries while they are charging, and for other purposes. A switch 28 is provided by means of which the voltmeter may be associated either with the main battery 2 or with the auxiliary battery 20.

The operation of the invention will now be described, it being assumed for this purpose that the truck in which the equipment is installed has been standing idle over night and is just being started up preparatory to a trip to some distant point. The procedure followed in starting the motor under normal and various adverse conditions will first be explained.

If no adverse factors are present, the motor is started in the usual way by first closing the main ignition switch 14 and then depressing the starting switch 4. The operation of the starting switch connects the starting motor 3 to the main storage battery 2, whereupon the starting motor turns the engine over and the cylinders start to fire. The ignition system is supplied with current from the main battery 2 through the switch 14 and under ordinary conditions the motor will readily start up as described. As soon as the engine picks up speed the generator voltage rises sufficiently to operate the cutout 12, and the generator now supplies current to the ignition system, also being effective to charge the main battery 2.

It will be assumed now that the weather is cold at the time the engine is being started up and that it turns over only with some difficulty, sufficient to cause a fall in potential at the battery 2 which interferes with the proper operation of the ignition system. Under these conditions the driver, observing that the engine does not start to fire after turning over slowly several times, at once releases the starting switch 4 so as not to waste any energy from the battery 2. He then opens the main ignition switch 14 and closes the auxiliary ignition switch 27. Having made these changes in the circuit connections, the driver again depresses the starting switch 4. The starting motor will therefore start to turn the engine over as before, but this time, due to the fact that the auxiliary battery is connected so as to supply current to the ignition system, the latter will receive current at the proper voltage and the engine will start to fire. As soon as the engine is started and running properly, the main ignition switch 14 is again closed, and the auxiliary ignition switch 27 is opened.

Under still more adverse conditions, it may be found that the engine is "frozen"; that is, the oil may be so congealed on an especially cold morning that the battery 2 does not furnish enough power to even turn the engine over. Under such extreme conditions a somewhat different procedure may be adopted which is usually successful. The main ignition switch 14 is first closed, and then the auxiliary ignition switch 27 is closed also. This connects the batteries 2 and 20 in parallel. The starting switch 4 is now closed, connecting up the starting motor 3, and the latter is supplied with current from both batteries, furnishing enough power to turn over the engine. At least, if the two batteries in parallel will not do so, the condition is hopeless. Assuming that the engine can be turned over, the starting switch 4 is kept closed for a few moments, sufficient to rotate the crank shaft a few times and loosen it up. The motor may start to fire during this interval, but as there will be a considerable fall in potential at the batteries, it may not start to fire. Assuming that it does not, the main ignition switch 14 is opened, and the starting switch 4 is again depressed. As the engine has already been turned over a number of times, the battery 2 will now furnish sufficient power to turn it over again, and the battery 20 will furnish current to the ignition system at full voltage so that the cylinders will readily start to fire. This latter procedure of course need be adopted only under extremely adverse conditions, but when the necessity arises it affords a method of starting that is generally successful and enables the engine to be started under conditions so extremely severe as to make starting by the ordinary procedure entirely impossible.

It will be assumed now that the truck proceeds on its way, with the main ignition switch closed and the auxiliary ignition switch open. The generator thus supplies current for the ignition system and also charges the main storage battery 2. It will be assumed that the generator is adjusted so that when running under these conditions it will have an output of about 20 amperes, or somewhat below its maximum rating. As the ignition system takes about 4 amperes, the battery 2 will be charged at the rate of about 16 amperes. Assuming that the battery was about half discharged at the beginning of the trip, it will charge up in about four hours of steady running. The switch 28 should be left in its lower position so as to maintain the voltmeter 26 connected to the main battery 2. By observing the voltmeter occasionally, the driver can tell when the battery 2 becomes charged. Allowing for stops and times when the output of the generator is reduced due to reduction in speed of the truck, probably five or six hours or even more will elapse before a full state of charge is reached.

When running under the foregoing conditions, the ammeter A shows the total amount of current received by the main battery 2 and the ignition system. If he desires to check up on the amount of current taken by the ignition system and the battery separately, the driver may close the auxiliary ignition switch 27 and open the main ignition switch 14. With these connections existing, the ignition system will be supplied with current from the auxiliary battery 20 through the ammeter 21, which will show a reverse reading, and the generator output will go into the main battery 2, the ammeter 11 showing the charging current, which of course will be somewhat greater than when the generator is also carrying the ignition load. If, as sometimes happens, the main battery 2 should have become almost entirely discharged, due to trouble in starting, it may be desirable to run with the circuits in this condition for a short time in order to replace a substantial amount of energy in the main battery 2 as quickly as possible. The switch 14 may then be closed again while switch 27 is opened.

As soon as the driver observes that the battery 2 is fully charged he will close the switch 23, thereby connecting the battery 20 to the generator in parallel with the battery 2. If the battery 20 is nearly discharged at the time, it will take a considerable load, and the total load on the generator might therefore rise too high if the battery 20 were connected directly to the generator without any intervening resistance. The switch 23 is therefore adjusted to leave sufficient resistance in the circuit so that there will be no danger of overloading the generator. By observing the two ammeters the driver can tell what the output is, and will regulate the switch accordingly. The resistance can be entirely cut out within a short time and may not have to be used at all. With the switch 23 fully closed, a stable running condition prevails in which the generator supplies the ignition system through the cutout 12 and ammeter 11, while supplying a small amount of current to the main battery 2 in order to keep it charged, and also charges the auxiliary battery 20 over the circuit including the switch 23, output 22 and ammeter 21. The switch 28 is now preferably thrown to its alternate position so as to connect the voltmeter to the auxiliary battery 20, and it will show the voltage of the generator, or the charging voltage of the battery.

While charging the auxiliary battery 20 under the above running conditions, the ignition system is preferably supplied with current from the main battery 2; that is, the main ignition switch 14 is left closed, while the auxiliary switch 27 is open. The object of this is to minimize the danger of overcharging the main battery 2. It is true, of course, that as long as the auxiliary battery 20 is partly discharged and the main battery 2 is fully charged, the voltage of the former will be the lower, and it will take the most current. But this desirable condition can be accentuated by supplying the ignition current through the main ignition switch 14 from the charging circuit of the main battery. With this circuit connection, the current flow through the cutout 12, which has some resistance, although it is very low, must divide between the main battery 2 and the ignition system. It follows, therefore, that until the auxiliary battery becomes substantially charged, the main battery will receive only a small amount of current, or enough to keep it in the desired high state of charge.

So far nothing has been said about the load on the system other than the starting motor, used temporarily on starting up, and the ignition system. During daytime running the lights will not be used at all, and the other current-consuming equipment will generally be used to a minimum extent, and often not at all. It may be necessary to use a heater on some days, however, and the driver may want to turn on the radio occasionally, although he can be instructed to dispense with the latter, at least until the batteries are both charged.

The radio and heater and other devices that may be provided are plugged in at the service sockets and take their current from the auxiliary battery 20 when the latter is not charging; and it may not be possible, therefore, to continue charging the main battery as described until it is fully charged. The current drain on the auxiliary battery is shown by the ammeter 21, and the driver may also test the voltage occasionally with the voltmeter 26. Thus, the driver can tell when the auxiliary battery is in danger of being too far discharged, and will be properly advised to close the charging switch 23, even though the main battery 2 is not yet fully charged. The generator 13 then carries the load at the service sockets, and the excess current is used to charge the two batteries in parallel.

When the above conditions prevail, it is preferable to close the auxiliary ignition switch 27 and open switch 14, supplying the ignition system with current from the auxiliary charging circuit. This is because it is desirable to recharge the main battery as quickly as possible, even at the expense of the auxiliary battery, as the former is relied on for the principal starting duty and should be kept fully charged so far as possible. By supplying the ignition system from the auxiliary charging circuit the main battery can be favored somewhat and charged more quickly than would be the case if the ignition system continued to be supplied through the switch 14. As soon as the main battery becomes charged, of course, the switch 14 may be closed and switch 27 may be opened, so as to give preference to the auxiliary battery 20. Unless exceptional conditions obtain, the auxiliary battery should be substantially charged before darkness ensues.

When the lighting switch 7 is closed to turn on the headlights and the running lights, the load will be substantially increased. Also, the load due to the use of the various current-consuming devices will generally be at a maximum during the night, as the need for the heater will increase due to the falling temperature, and the radio will be wanted not only as a means of entertainment, but in order to keep the driver awake. With everything turned on, the load will probably be greater than the generator can handle, and current will have to be supplied from the batteries to some extent. The drain on the batteries can be determined by means of the two ammeters 11 and 21. The ammeter 21 will show a reverse deflection indicating the discharge current from the auxiliary battery 20. The ammeter 11 likewise may show a reverse deflection, but the current taken by the ignition system must be added to the reading in order to obtain the total discharge current on the main battery; at least this is the case so long as the ignition system is being supplied with current through the main ignition switch 14. Now, if there is any great inequality of output which might dangerously discharge one battery or the other, the ignition system may be switched to the battery having the lowest output. Thus, the ignition system is a constant load which can be shifted to either battery in accordance with the load conditions and the current demands created thereby, and enables the load on the two batteries to be measurably equalized. At the same time, the face that the ignition system is connected to the battery having the lowest output insures that it is connected to the battery having the greatest voltage, which makes for satisfactory operation of the ignition system.

The amount of energy taken out of the batteries during the night will of course depend on the season, and on the duration of the night driving. If the truck is laid up at midnight, to enable the driver to get some sleep, the period of driving in darkness will not exceed about seven hours, which obviously will not deplete the batteries to any great extent, and they will have an ample charge for starting the next morning. If the truck is driven all night, as is generally done if two drivers are provided, the drain on the batteries will be proportionately greater. Assuming about fourteen hours of darkness, about the worst condition, if there is a drain of five amperes on each battery, this would mean a discharge of about 70 ampere-hours for each battery. Even under these conditions, however, the batteries should have entirely sufficient power to maintain the load and at the same time provide for satisfactory ignition until daylight comes and the lights can be shut off. The starting of the engine after an all night run does not present any problem, as only a relatively short stop will be made for breakfast and for refueling, and the engine will not have a chance to cool off completely.

It will be understood of course that trucks are operated under widely variable conditions and that the operations described in the foregoing are merely one example of what may take place in actual practice. The conditions described, however, are typical, and the explanation of the operations under these conditions serves to give a good understanding of the possibilities of the system. Under different conditions, changes in the operating procedure can be made, as will readily be understood.

Some of the advantages of the system have already been pointed out. Some other advantages may now be explained briefly.

The additional devices, such as radio and heater, are a likely source of trouble, especially when carried on trucks, and short circuits are known to occur. Also these devices are manually connected and disconnected, and the driver will frequently forget to turn them off. This is especially true of the heater. Now, with the ordinary starting system, if the heater is left on all night, for instance, the battery will be entirely discharged, regardless of its capacity within practical limits, but in my improved system such eventuality would merely result in discharging the auxiliary battery, leaving the main battery unaffected and available for starting. The same is true if an accidental short circuit should take place in the radio, heater, or other device connected to one of the service sockets. On the other hand, a short circuit in the lighting circuit might occur, especially when a trailer is used, and might seriously discharge the main battery before being discovered. The auxiliary battery is not discharged, however, and thus a source of power remains which can be availed of for starting, after the trouble is cleared, by closing both the ignition switches. It will be seen therefore that there is a decided advantage in providing two batteries instead of one, even though the total capacity may be the same, because the various load circuits are divided between the batteries and the likelihood of the stored energy being entirely dissipated by accidental disorders in the load circuits is greatly reduced. While I have shown the lighting circuit as being supplied from the main battery and the service sockets connected to the auxiliary battery, I do not limit myself to this particular arrangement, as other divisions of the load are possible and may be desirable under certain circumstances.

Another source of trouble in the ordinary starting system is the relay or cutout, which is usually mounted on the generator and is subject to rather high temperatures. If the cutout fails to close, the battery cannot be charged and an emergency stop will have to be made at the first service station encountered. In my improved system, the cutout 12 is of course subject to the same conditions as in the ordinary system, but if it should fail to close, the driver can immediately close the switch 23 and the auxiliary ignition switch 27, also opening the main ignition switch 14, if the failure occurs in the daytime. The ignition load and any other load that may be on are thus carried from the auxiliary charging circuit, and surplus current is stored in the auxiliary battery. This enables the run to be continued until the next scheduled stop without serious disruption of the normal operations, as the main battery simply stands idle.

If the above trouble should occur at night, the main ignition switch 14 would have to be closed also, to enable the lighting circuits to be supplied through the two ignition switches in series. The same procedure is followed if the cutout 22 should fail to close. This is not liable to happen, but it is a possibility. If the cutout 22 should fail to close, the closure of both ignition switches will extend a connection from the main charging circuit to the service sockets and will enable the generator to carry the load at the sockets. With both ignition switches closed, the two batteries are connected in parallel and the surplus current generated, if any, is divided between them. The flexibility of the system is somewhat impaired, due to the fact that the ignition system cannot be switched from one battery to the other, but satisfactory operating conditions are maintained until repairs can be conveniently made.

It will be apparent, in view of all the foregoing, that I have devised an exceedingly satisfactory electrical system for a motor vehicle, especially adapted for use under difficult conditions, such as those which obtain on trucks, for example, and that the system has many advantages over systems in common use. While I have shown a certain specific form of the invention, it is capable of modification, and I do not therefore wish to limit myself to the precise arrangement illustrated and described herein, but desire to include and have protected by Letters Patent all forms and modifications which come within the scope of the appended claims.

I claim:

1. In a starting and ignition system, main and auxiliary storage batteries, a generator for charging said batteries, a motor, a switch for connecting said motor to the main battery, an ignition system, a switch for connecting said ignition system to the main battery, an independently operable switch for connecting said system to the auxiliary battery, and circuit connections including said switches whereby the motor may be connected to the main battery alone or to the two batteries in parallel and the ignition system may be connected to either battery alone or to the two batteries in parallel.

2. In a starting and ignition system, main and auxiliary batteries, a generator for charging said batteries, a motor, an ignition coil, a starting switch, a main ignition switch, an auxiliary ignition switch, a circuit including the motor, starting switch and main battery, a second circuit including the main battery, the main ignition switch and the primary winding of said coil, a third circuit including the auxiliary battery, the auxiliary ignition switch and the primary winding of said coil, and a fourth circuit including the auxiliary battery, both ignition switches in series, the starting switch, and the motor.

3. In a starting and ignition system for a motor vehicle, main and auxiliary batteries, a starting motor, an ignition system, means for connecting both batteries to said starting motor in parallel to operate said motor for the purpose of preliminarily loosening up the engine in cold weather, and means for then separately connecting said batteries to the starting motor and ignition system, respectively, whereby the main battery operates the starting motor to turn over the engine and the auxiliary battery supplies current to the ignition system, a generator, means for automatically connecting said generator to the main battery alone responsive to starting of the engine, and a switching device for connecting said generator to the auxiliary battery after said main battery has become charged to a desired extent.

4. In a starting and ignition system, main and auxiliary batteries, a generator, parallel charging circuits for said batteries including said generator, an ammeter included in each charging circuit, an ignition system, means for connecting said system to said auxiliary battery over a circuit path including the associated ammeter, and means for connecting said system with the main battery over a path excluding the associated ammeter.

5. In a starting and ignition system, main and auxiliary batteries, a generator, a charging circuit for the main battery including said generator, a cutout, an ammeter and the main battery, a charging circuit for the auxiliary battery including said generator, a switch, a second cutout, a second ammeter and the auxiliary battery, a conductive connection between said charging circuits extending from a point between the cutout and ammeter in the second circuit, said connection including two ignition switches, and an ignition system tied on to said conductive connection at a point between said ignition switches.

6. In an electrical system for motor vehicles, main and auxiliary batteries, a generator, a charging circuit including said generator and the main battery, a second charging circuit including said generator and the auxiliary battery, a manual switch for opening and closing said second charging circuit, a variable load connected to the main battery, a variable load connected to the auxiliary battery, a third load, and means for switching said third load to either battery at will depending on the instant value of said variable loads and on whether it is desired to equalize the charging rates of said batteries or favor one battery over the other while the main battery alone is being charged.

7. In an electrical system for motor vehicles, a main storage battery, a generator, means including a cutout for connecting said generator to said battery to charge the same while the generator is running, an ignition system also supplied with current by the generator, an auxiliary battery, a switch and a second cutout for connecting said generator to said auxiliary battery when said main battery becomes charged, whereby overcharging of said main battery is prevented, and means for variably limiting the amount of current delivered by the generator to the auxiliary battery to prevent overloading of the generator.

8. In an electrical system for a motor vehicle, said system including a generator, main and auxiliary batteries, and an ignition system, the method of operation which comprises charging the main battery separately until it becomes fully charged, diverting the surplus current to the auxiliary battery after the main battery is charged to avoid overcharging the main battery and waste of current, and regulating the charging rate of said batteries by supplying the ignition system from the charging circuit of one battery or the other depending on which battery is to be charged at the lowest rate.

HENRY C. DREISCHERF.